United States Patent

Marino et al.

[15] 3,668,669

[45] June 6, 1972

[54] MAGNETIC HEAD WITH WRITE GAP WIDER THAN TAPE AND READ GAP NARROWER THAN TAPE

[72] Inventors: Francis C. Marino, Huntington; Edgar Wolf, New Hyde Park, both of N.Y.

[73] Assignee: Digitronics Corporation, Albertson, N.Y.

[22] Filed: Oct. 1, 1969

[21] Appl. No.: 862,659

[52] U.S. Cl.............340/174.1 F, 179/100.2 C, 340/174.1 G

[51] Int. Cl.........................................G11b 5/26, G11b 5/44

[58] Field of Search.......179/100.2 C; 340/174.1 F, 174.1 G, 340/174.1 H

[56] References Cited

UNITED STATES PATENTS

| | | | |
|---|---|---|---|
| 2,736,776 | 2/1956 | Camras | 179/100.2 C |
| 3,271,750 | 9/1966 | Padalino | 340/174.1 G |
| 3,341,667 | 9/1967 | Brown et al. | 340/174.1 F |
| 3,514,851 | 6/1970 | Perkins et al. | 179/100.2 C |

*Primary Examiner*—Bernard Konick
*Assistant Examiner*—J. Russell Goudeau
*Attorney*—Yuter & Fields

[57] ABSTRACT

The head construction is adapted to be used with a magnetic tape medium having a preselected width and comprises a first magnetic head having a first air gap having a height substantially in excess of the tape medium and a second magnetic head having a second air gap having a height substantially less than the width of the tape medium. The first air gap is in spaced relationship to the second air gap and first and second coils are respectively magnetically linked with the first and second magnetic heads.

11 Claims, 7 Drawing Figures

INVENTORS
Francis C. Marinc
Edgar Wolf
BY Yuter + Fields
ATTORNEYS

MAGNETIC HEAD WITH WRITE GAP WIDER THAN TAPE AND READ GAP NARROWER THAN TAPE

This invention relates generally to magnetic head constructions and systems therefor and, more particularly, pertains to magnetic head constructions which are ideally suited for use with magnetic tape cassettes.

The present trend toward the miniaturization of electronic components and systems is multiplying at a geometric rate. In fact, work is presently progressing in the direction of miniature computers, data processing apparatus and data acquisition systems. However, presently available tape transports are completely inappropriate for use in such systems because of their size, weight and cost. Accordingly, there is a need for miniaturized magnetic tape transports which are compatible for use in the aforementioned miniaturized systems.

One such transport which is ideally suited for such miniaturized use is the presently commercially available tape cassette which is heavily used in the audio tape industry. On one hand, this cassette is manufactured and is available in large quantities and, further, is widely distributed in both this country and abroad. On the other hand, tape cassettes of the type under consideration have various disadvantages associated with their use when they are adapted for digital applications.

For example, the tape reel inertia cannot be isolated from the driving capstan in cassette transport systems. Consequently, the tape skews and the head tracking characteristics deteriorate. These conditions become worse following each stopping and starting movements of the tape, which movements are inherent in any digital system employing magnetic tape. Magnetic head configurations now in use for such cassettes have been designed for continuous tape movement during audio recording or playback and are useless when the tape is moved intermittently and the aforementioned tape skew and tape tracking difficulties are encountered.

Accordingly, an object of the present invention is to provide improved magnetic head configurations for particular use with magnettic tape cassettes.

A more specific object of this aspect of the invention is to provide magnetic head constructions for use with magnetic tape cassettes which are reliable in operation.

Another object of this aspect of the invention resides in the novel details of construction which provide magnetic head configurations which are fully compatible for use with presently available tape cassettes.

A further object of the invention is the provision of magnetic head constructions which are relatively inexpensive to manufacture and which minimize the problems of tape skew and tape tracking.

Accordingly, a magnetic head construction fabricated in accordance with the present invention is adapted to be used with a magnetic tape cassette having a magnetic tape medium of a preselected width. The head construction comprises a first magnetic head having a first air gap and a second magnetic head having a second air gap which is spaced from the first air gap. A first and second coil are respectively magnetically linked with the first and second magnetic heads. The first head is sized so that the first air gap has a height in excess of the preselected width and is positioned so that the first air gap extends beyond the edges of the tape medium to insure recording over the entire medium, regardless of skew. The second head is sized so that the second air gap has a height which is less than the preselected width and is positioned so that the tape medium extends beyond the edges of said second head to compensate for tape skew.

A magnetic head construction of the type described above is particularly adapted for digital application and, in particular, is most advantageously used in so-called read-after-write operations. However, as is common in such operations, write-to-read crosstalk develops between the write and read heads thereby producing erroneous recording.

Accordingly, another object of a further aspect of this invention is to provide an improved system for substantially eliminating write-to-read crosstalk in magnetic head constructions.

A more specific object of this aspect of the invention is the provision of a system for eliminating erroneous data due to crosstalk on a tape medium which is reliable in operation.

Other features and advantages of the present invention will become more apparent from a consideration of the following detailed description when taken in conjunction with the accompanying drawings, in which.

As noted above, the magnetic head constructions of the present invention are to be used with magnetic tape cassettes of the type presently extensively used in the audio industry. The transport mechanisms for such cassettes similarly are widely used. Accordingly, in the interest of clarity, only those portions of the tape cassette and transport mechanism necessary for an understanding of the present invention are disclosed herein. If one desires more information on these devices, he is referred to any radio application store which sells tape recorders or the like.

Figure 1:
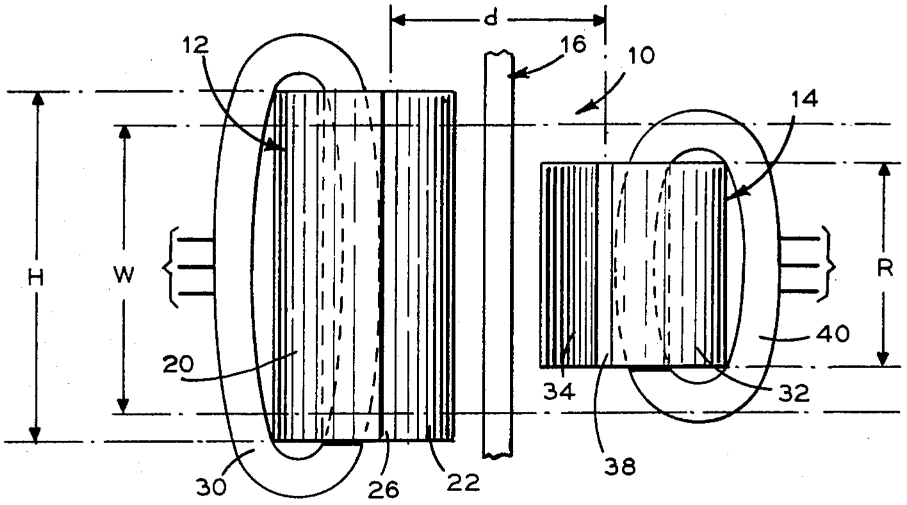
FIG. 1 is a front elevational view of a magnetic head construction made in accordance with the present invention, to an enlarged scale.
Figure 2:
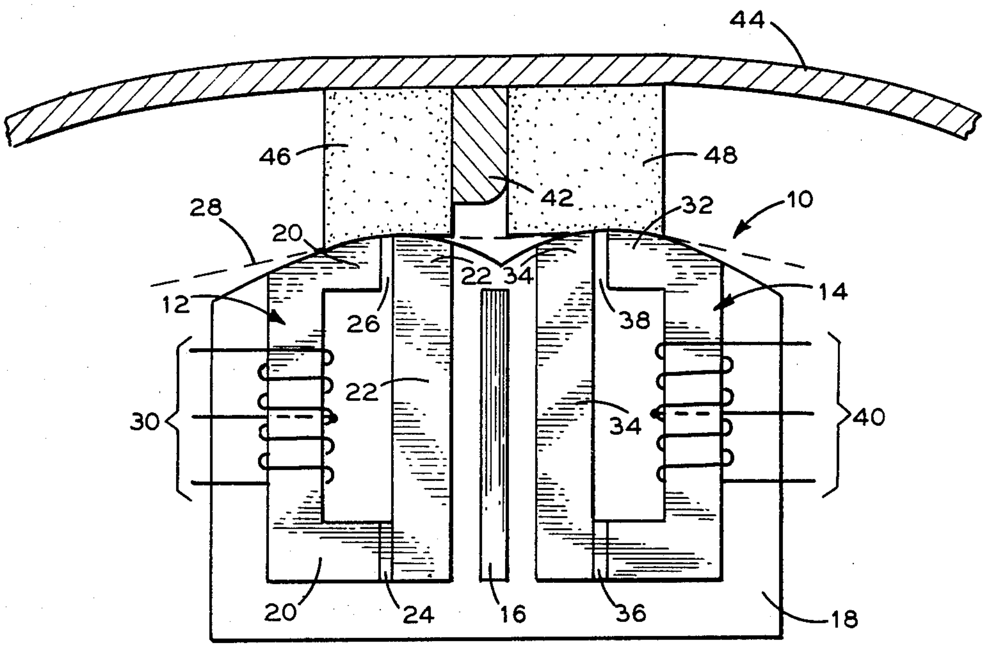
FIG. 2 is a top plan view thereof.

Accordingly, FIGS. 1 and 2 illustrate a magnetic head construction which is designated generally by the reference numeral 10. The head construction includes a write head 12, a read head 14 and an inter-head shield 16 which are mounted on a support 18 fabricated from a non-magnetic material.

More specifically, the write head 12 includes a core of magnetic material comprising a C-section 20 and an I- section 22. The section 22 is connected to the section 20 at the rear end thereof by a spacer 24 of magnetic material and the front portion of the sections are substantially parallel so that a write air gap 26 of substantially uniform length is defined between the front ends of sections 20 and 22. As shown in FIG. 2, the write air gap 26 is positioned adjacent the tape medium path 28 so that the magnetic tape passes across the gap 26 as it moves from the feed to the take-up reel (not shown). Additionally, the front faces of the section 20 and 22 are curved convexly outwardly to facilitate movement of the tape medium across the gap 26. A write coil 30 surrounds the leg of the C-section 20 and is adapted to carry electric signals in accordance with the information which is to be recorded on the tape medium.

Spaced from the write head 12 in the direction of movement of the magnetic tape medium during recording or writing is the read head 14 which is similarly mounted on the support 18 of non-magnetic material. The head 14 is similar in construction to the head 12 and likewise includes a core of magnetic material comprising a C-section 32 and an I-section 34. The sections 32 and 34 are connected together at the rear of the head 14 by a spacer 36 of magnetic material and the front ends of the sections are substantially flat and parallel so that a so-called read air gap 38 is defined at the front end of the head, said air gap 38 being substantially uniform throughout its length. A read coil 40 surrounds the middle leg of the C-section 32 of the core and is adapted to convert the magnetic variations representing the data recorded on the tape medium into appropriate electrical signals. As shown in FIG. 2, the face of the head 14 is curved convexly outwardly to conform to the curvature of the tape path 28 to facilitate movement of the tape past the head and to insure that the tape makes intimate contact with the gap 38.

As noted above, the present head configuration is adapted to be used with existing tape cassettes. Accordingly, the width of the slot opening in such cassettes to accommodate the head construction is fixed and places an upper limit on the spacing between the write air gap or writegap 26 and the read air gap or readgap 38, the spacing being designated by the letter *d* in FIG. 1. However, in order to obtain maximum tape storage efficiency, the interrecord space (i.e., the space between blocks of data) must be kept to a minimum. The interrecord space is determined by parameters which include the start-stop characteristic of a given tape transport mechanism and the aforementioned distance *d*. In order to minimize the magnetic head construction 10 as being the limiting factor, the distance *d* between the write and read gaps is kept to a minimum. However, as the distance or spacing *d* decreases, the write-to-read crosstalk increases.

Accordingly, in order to minimize write-to-read crosstalk, a shield 16 is mounted on the support 18 approximately midway between the heads 12 and 14. The shield 16 is fabricated from a magnetic material (preferably, a ferromagnetic material) and is operable to substantially reduce crosstalk of the aforementioned type. Additionally, the tape cassette is provided with a magnetic shield 42 to further reduce the effects of crosstalk.

To be more specific, presently available cassettes include a non-magnetic spring support 44 which biases the tape medium into intimate contact with the tape heads through respective felt pads 46 and 48. More particularly, the pads 46 and 48 are mounted on the spring support 44 which exerts a biasing force on the pads in the direction of the heads 12 and 14. The tape medium moves past the heads, as indicated by the tape path 28, and the pads are positioned in juxtaposition to the respective gaps 26 and 38. In operation, the heads are moved into intimate contact with the tape medium against the pads 46 and 48 so that the spring support 44 flexes slightly but maintains the tape in contact with the respective heads through the felt pads 46 and 48. As shown in FIG. 2, the magnetic shield 42, which may be of the same material as the shield 16, is positioned between the pads 46 and 48.

As shown in FIG. 1, the tape medium width normally utilized in the tape cassette under consideration is designated by the reference character W. In accordance with a feature of this invention, the height of the write head 12 , and therefore the height of the gap 26, which is designed by the reference character H, extends beyond the width W of the tape medium. This construction ensures that writing of a word will be accomplished substantially across the entire width of the tape medium regardless of tape skew.

On the other hand, the height of the read head and, therefore, the height of the gap 38, which is indicated by the reference character R, is made less than the tape width W. Thus, the shorter height R greatly increases the tolerance of the present construction to tape skew for a given bit packing density.

In one embodiment of the magnetic head construction 10, the following dimensions were used with a tape width W of 150 milli-inches:

| | |
|---|---|
| Write gap **26** length | 500 microinches |
| Read gap **38** length | 100 microinches |
| Height "H" of write head gap | 180 milli-inches |
| Height "R" of read gap | 120 milli-inches |
| Gap separation ("*d*") | 100–150 milli-inches |

A problem is encountered with respect to read signals since these signals are reduced in amplitude as the read gap 38 height is reduced and read signal "drop-out" may occur due to tape damage and dirt. Accordingly, the system shown in FIG. 3 is ideally suited for use with the head construction 10.

Figure 3:
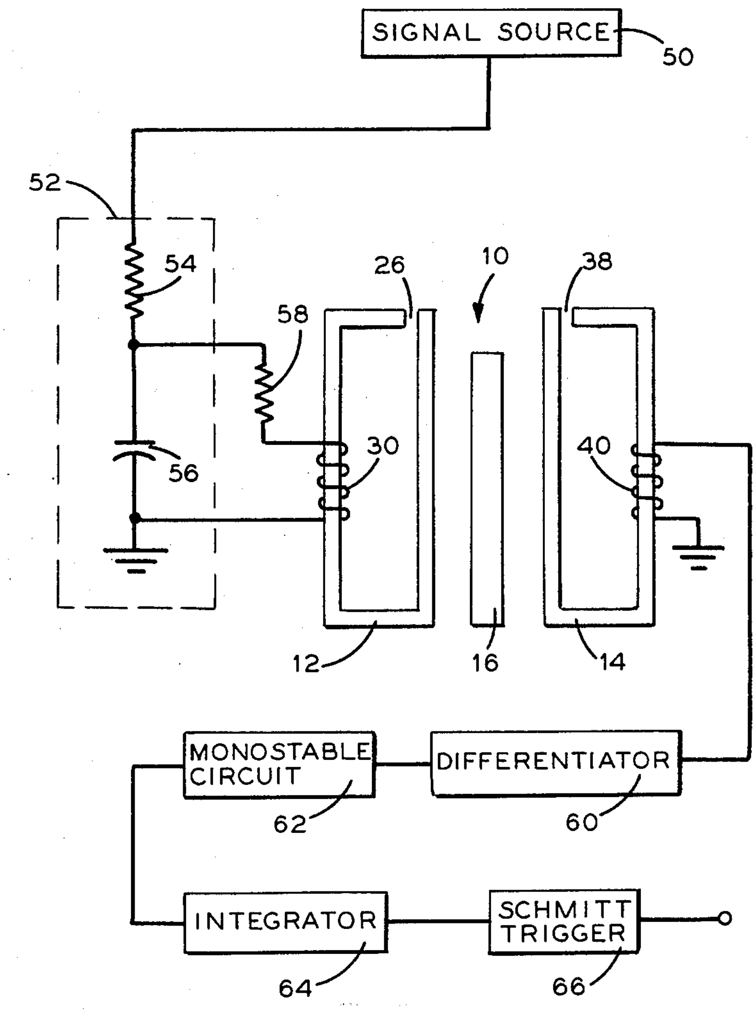
FIG. 3 is a circuit wiring diagram, partially in block form, of a system which substantially reduces recording errors arising because of crosstalk for use with the magnetic head constructions of the present invention.

More specifically, the system of FIG. 3 includes a conventional signal source 50 which is operable to produce the write signals in the conventional manner so that data may be recorded on the tape medium. An integrating circuit 52 is connected between the output of the source 50 and the write coil 30. The circuit 52 includes a series resistor 54 and a shunt capacitor 56 connected between the end of the resistor 54 and ground. Connected in parallel with the capacitor 56 is the series circuit of a resistor 58 and the write coil 30.

The crosstalk mentioned above is dependent on the rate of change of the magnetic field with respect to time or upon the function dB/dt where dB/dt represents the derivative of the magnetic field with respect to time. The integrating circuit 52 is adapted to slow the rise of current in the circuit or to decrease the function dB/dt thereby further reducing write-to-read crosstalk.

In view of the fact that some crosstalk may still exist, the read circuitry of the system of FIG. 3 eliminates peak detection of the signal. Thus, a differentiating circuit or differentiator 60 is connected to the read coil 40. Connected to the output of the differentiating circuit 60 is a monostable circuit or amplifier 62. The output of the amplifier 62 is connected to an integrator 64 which, in turn, is connected to a Schmitt trigger 66. The circuit elements 60–64 are adapted to produce an output pulse only when the pulse produced by the read coil 40 exceeds a preselected width. Thus, when data is recorded on the magnetic tape medium using an NRZ system (non-return-to-zero) and such data passes the read gap 38, the read coil 40 will produce such a pulse. The chain comprising the elements 60–66 is described more fully in copending application Ser. No. 830,838 filed June 5, 1969, entitled Noise Insensitive Peak Detector, and is assigned to the assignee of the present invention, now U.S. Pat. No. 3,617,904.

Accordingly, a head construction 10 and a system therefore has been disclosed which is compatible fur use with existing magnetic tape cassettes for utilizing such cassettes for digital application and wherein the recorded data may be read either simultaneously with such recording or sequentially thereafter.

Figure 4:
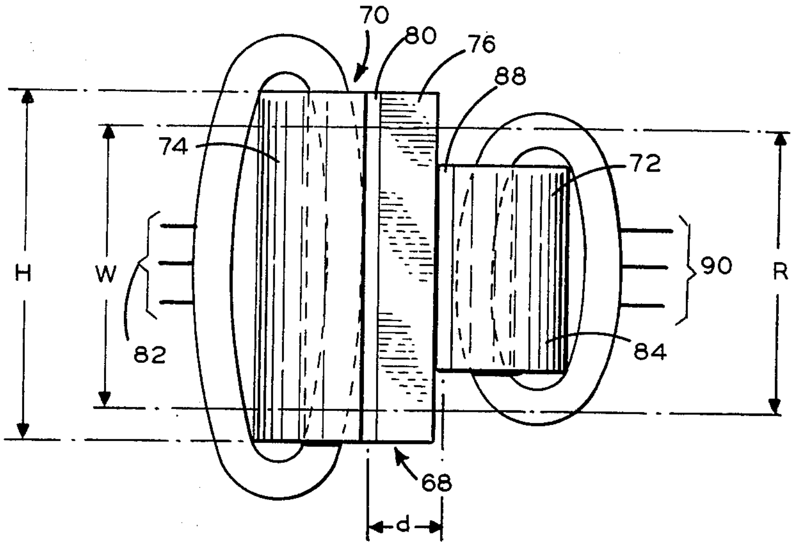
FIG. 4 is a front elevational view, to an enlarged scale, of a modified embodiment of a magnetic head construction made according to the present invention.
Figure 5:
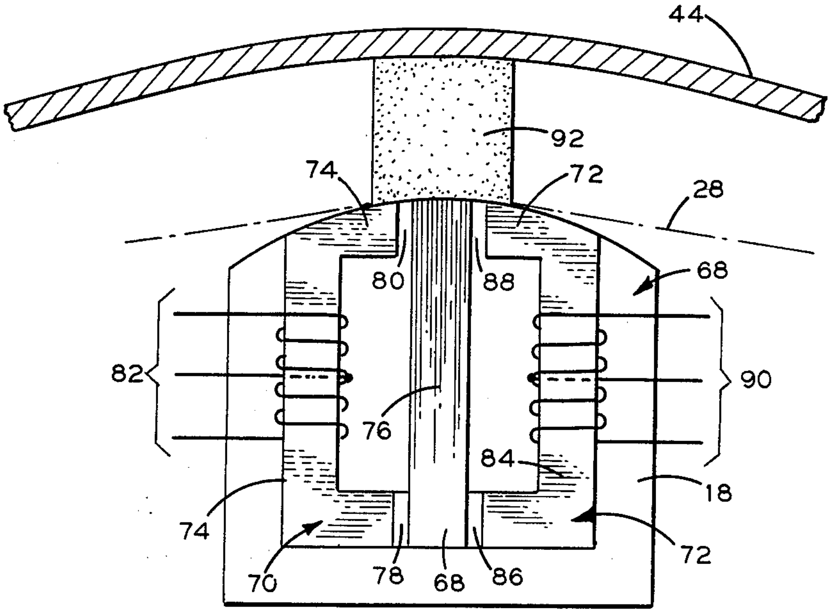
FIG. 5 is a top plan view thereof.

A modified embodiment of a magnetic head construction is shown in FIGS. 4 and 5 and is designated generally by the reference numeral 68. The width W of the tape medium and heights H and R and the gap lengths of the respective write head and read head are substantially the same as in the head construction 10, however, the distance *d* between the write and read gaps of the head 68 has been reduced substantially by providing a common core for the heads.

More specifically, the head construction 68, which is mounted on the non-magnetic support 18, includes a write head 70 and a read head 72. The write head 70 comprises a C-section 74 and an I-section 76 which are connected together at the rear end by a spacer 78 of magnetic material to define a write air gap of substantially uniform length 80 at the front end. A write coil 82 surrounds the leg of the section 74.

The read head 72 includes a C-section 84 which is connected at the rear and thereof to the common I-section 76 by a spacer 86 to define a read air gap 88 of substantially uniform length at the front end. A read coil 90 surrounds the section 84. Additionally, the sections 74, 76 and 84 are fabricated from a magnetic material.

The front face of the head 68 is curved convexly outwardly to conform to the path 28 of the tape medium. Additionally the cassette is provided with a single felt pad 92 which is mounted on the spring support 44 rather than the two pads shown in the embodiment of FIGS. 1 and 2 to force the tape into intimate contact with the write and read heads.

In the head construction 68, the write-to-read gap separation (i.e., the distance *d*) can be reduced to 0.025–0.040 inch. Due to this relatively small separation between the gaps, the write-to-read crosstalk would be too large to permit writing and reading to occur simultaneously. However, if the serial length of a single character is made some fraction less than half of the intergap distance *d*, then writing and reading will never occur simultaneously and the amount of cross-talk is of no consequence. Thus, the head construction 68 is ideally suited for an incremental mode of operation where one character per block is to be recorded sequentially on tape and where minimum inter-record space is required to maximize the incremental character packing density. As noted above, as in the case of the embodiment of FIGS. 1 and 2, the respective heights of the write and read heads is designed to minimize the accuracy required of the tape transport in providing either incremental or continuous bi-directional tape motion.

Additionally, it is to be noted that the electronic circuitry of the system of FIG. 3 is ideally suited for use with the head construction 68 where the bit density is relatively low, such as 200 bits/inch, for example.

Accordingly, the head construction 68 provides a read-after write facility with a minimum of write-to-read gap separation.

Figure 6:
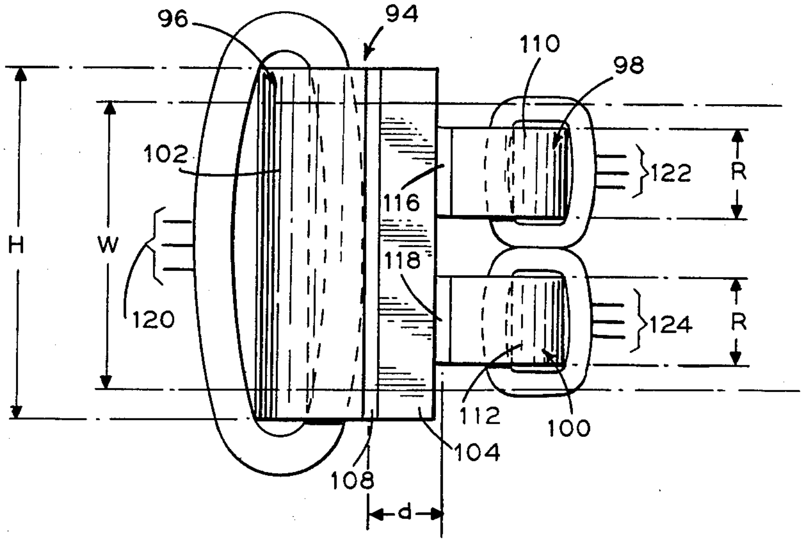
FIG. 6 is a front elevational view, to an enlarged scale, of a further modified embodiment of a magnetic head construction.
Figure 7:
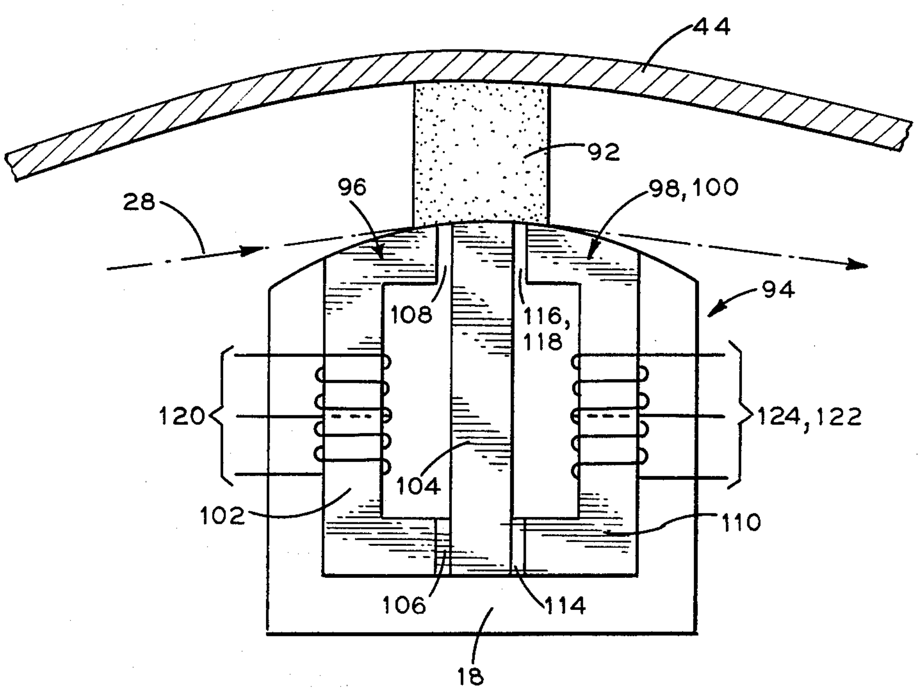
FIG. 7 is a top plan view of the head shown in FIG. 6.

FIGS. 6 and 7 illustrate a further modified embodiment of a head construction which is designed generally by the reference numeral 94. The head construction 94 is similar to the head construction 68 with the exception that two spaced read heads are provided. More specifically, the head construction 94 includes a write head 96 and respective read heads 98 and 100. The head 96 comprises a core of magnetic material formed from a C-section 102 and a common I-section 104. The section 104 is connected to the section 102 at the rear thereof by a spacer 106 of magnetic material. The front end of section 102 is spaced from the section 104 to define a write air gap 108 of uniform length.

Also connected to the I-section 104 are respective C-sections 110 and 112. As shown in FIG. 7, the C-section 110 is connected to the I-section 104 at the rear end thereof by a spacer 114 of magnetic material. The front end of the C-section 110 is spaced from the section 104 to define a read air gap 116 of uniform length. Similarly, the C-section 112 is connected to the rear of the common I-section 104 to define a read air gap 118 at the front end thereof which is spaced below and in alignment with the gap 116 and which is of substantially uniform length. A write coil 120 surrounds the central leg of the section 102 and respective read coils 122 and 124 surround the central legs of the C-sections 110 and 112. Additionally, the front faces of the sections 102, 104, 110 and 112 are curved to conform to the tape path 28. As in the embodiment of FIGS. 4 and 5, the Cassette spring support 44 and the felt pad 92 are utilized to bias the tape medium into intimate contact with the respective gaps.

As in the above-described embodiments, the magnetic tape medium has a width W as indicated by the appropriate dotted lines of FIG. 6. Additionally, the height of the write head 96 is in excess of the width W, as indicated by the reference character H in FIG. 6. On the other hand, each one of the read heads has a height R which is less than one-half of the dimension W. Accordingly, both heads fit within and are spaced from the boundaries defined by the dotted lines W to compensate for tape skew and minimize the accuracy of the transport mechanism.

As an example of the above, for a tape width W of 0.150 inch, the height R of each one of the read heads 98 and 100 may be 0.050 inch. The center line of the upper read head 98 may be spaced 0.040 inch below the upper dotted line defining the boundary W and the center line of the lower read head 100 may be spaced 0.070 inch below the center line of the head 98.

The read heads 98 and 100 may be used as write heads during write-only operations during which time full tape erase is effected by the head 96. The present head construction 94 may provide dual track redundant recording and playback as opposed to read-after-write operations with the head configurations of FIGS. 1–2 and 4–5. The broad erase (write) gap 108 eliminates the problem of improper erasure of pre-recorded data and may be separated from the read gaps 116 and 118 by the same distance *d* as in the head construction 68 shown in FIGS. 4–5. The heads 98 and 100 may also be utilized to read the information recorded on the magnetic medium, in the conventional manner.

Due to the relatively minimal erase (write)-to-read/write gap separation *d*, the head construction 94 may be used to record high bit densities with minimum interrecord spaces on the tape medium. Each one of the gaps 116, 118 may be about 100 microinches in length. As noted above, their centers are separated from each other by 70 milli-inches and are located 40 milli-inches from each edge of the 150 milli-inch tape medium. It is to be noted that the gaps 108 and 116, 118 are spaced far enough apart to increase the power of redundant recording and playback for high bit density applications.

Accordingly, magnetic tape medium head constructions and associated circuitry have been described which are adapted to be used with presently available audio tape cassettes to provide a reliable apparatus for recording digital information which minimizes the accuracy required in tape transport mechanisms.

While preferred embodiments of the invention have been shown and described herein, it will be obvious that numerous omissions, changes and additions may be made in such embodiments without departing from the spirit and scope of the present invention.

What is claimed is:

1. A magnetic head construction for use with a magnetic tape cassette having a magnetic tape medium of a preselected width, said head construction comprising a first magnetic head having a first air gap and a second magnetic head having a second air gap which is spaced from said first air gap by a predetermined distance no greater than said preselected width, a first coil magnetically linked with said first head, a second coil magnetically linked with said second head, said first head being sized so that said first air gap has a height at least 20 percent in excess of said preselected width and being positioned so that said first air gap extends beyond the edges of said magnetic tape medium, and said second head being sized so that said second air gap has a height which is at least 20 percent less than said preselected width and being positioned so that said magnetic tape medium extends beyond the edges of said second head.

2. A magnetic head construction as in claim 1, in which said first and second heads have substantially flat parallel pole faces to define said first and second air gaps, whereby said first air gap is of substantially uniform width throughout its length and said second air gap is of substantially uniform width through its length.

3. A magnetic head construction as in claim 1, in which said tape medium moves in an an arcuate path over the front faces of said heads, and said front faces of said first and second heads are curved to conform to said arcuate path.

4. A magnetic head construction as in claim 1, further including a magnetic shield between said first and second heads.

5. A magnetic head construction as in claim 1, in which said first magnetic head comprises a first section connected to an intermediate section at one end and spaced from said intermediate section at the other end to define said first air gap therebetween, and said second magnetic head comprises a second section connected to said intermediate section at one end and spaced therefrom at the other end to define said second air gap therebetween.

6. A magnetic head construction as in claim 1, in which said first magnetic head comprises a first section connected to an intermediate section at one end and spaced from said intermediate section at the other end to define said first air gap therebetween; and said second magnetic head comprises a second section connected to said intermediate section at one end and spaced therefrom at the other end to define said second air gap therebetween, and a third section connected to said intermediate section at one end and spaced therefrom at the other end to define another air gap therebetween which is in substantial alignment with said second air gap.

7. A magnetic head construction as in claim 6, the total height of said second and third sections is less than said preselected width and said second and third sections are positioned so that the tape medium extends beyond the second and third sections.

8. A recording system for recording data on a magnetic medium having a preselected width, said system comprising a signal source, a magnetic head construction connected to said signal source for converting data from said signal source into variations of a magnetic field to record said data on the medium, and current varying means between said magnetic head construction and said signal source to decrease the time rate of variations of the magnetic field, said magnetic head construction comprising a first magnetic head having a first air gap and a second magnetic head having a second air gap which is spaced from said first air gap by a predetermined distance no greater than said preselected width, a first coil magnetically linked with said first head and connected to said current varying means, a second coil magnetically linked with said second head, said first head being sized so that said first air gap has a height at least 20 percent in excess of said preselected width and being positioned so that said first air gap extends beyond the edges of the magnetic medium and said second head being sized so that said second air gap has a height which is at least 20 percent less than said preselected width and being positioned so that the magnetic medium extends beyond the edges of said second head.

9. A recording system as in claim 8, in which said current varying means comprises an integrating circuit.

10. A recording system as in claim 8, in which said second coil is connected to a series loop comprising a differentiator circuit, a monostable amplifier, an integrating circuit and a schmitt trigger circuit.

11. A recording system as in claim 8, in which said signal source and said magnetic head construction are operable to record data on said magnetic medium the length of said recorded data being less than one-half of said predetermined distance.

* * * * *